US012567589B2

(12) United States Patent
Torita et al.

(10) Patent No.: US 12,567,589 B2
(45) **Date of Patent: *Mar. 3, 2026**

(54) POSITIVE ELECTRODE, LITHIUM-ION SECONDARY BATTERY, AND METHOD OF PRODUCING POSITIVE ELECTRODE

(71) Applicant: TOYOTA JIDOSHA KABUSHIKI KAISHA, Toyota (JP)

(72) Inventors: Koji Torita, Nagoya (JP); Takuya Asari, Osaka (JP); Akihiro Ochiai, Toyonaka (JP); Yusuke Fukumoto, Toyonaka (JP); Naoyuki Wada, Hirakata (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 861 days.

This patent is subject to a terminal disclaimer.

(21) Appl. No.: 17/831,678

(22) Filed: Jun. 3, 2022

(65) Prior Publication Data

US 2022/0302460 A1 Sep. 22, 2022

Related U.S. Application Data

(63) Continuation of application No. 16/296,531, filed on Mar. 8, 2019, now Pat. No. 11,387,459.

(30) Foreign Application Priority Data

Mar. 12, 2018 (JP) ................................. 2018-044215

(51) Int. Cl.
H01M 4/66 (2006.01)
H01M 4/131 (2010.01)
(Continued)

(52) U.S. Cl.
CPC ........... H01M 4/661 (2013.01); H01M 4/131 (2013.01); H01M 4/139 (2013.01); H01M 4/667 (2013.01);
(Continued)

(58) Field of Classification Search
CPC ......... H01M 2004/028; H01M 4/0404; H01M 4/043; H01M 4/131; H01M 4/139;
(Continued)

(56) References Cited

U.S. PATENT DOCUMENTS 11,387,459 B2 * 7/2022 Torita .................... H01M 4/043
2004/0002006 A1 * 1/2004 Kelley .................. H01M 4/663
429/235

(Continued)

FOREIGN PATENT DOCUMENTS

CN 107492663 A 12/2017
JP 2003-157852 A 5/2003

OTHER PUBLICATIONS

Torita, Koji et al., U.S. Appl. No. 16/296,531, filed Mar. 8, 2019.

*Primary Examiner* — Brian R Ohara
*Assistant Examiner* — Brent C Thomas
(74) *Attorney, Agent, or Firm* — Sughrue Mion, PLLC

(57) ABSTRACT

A positive electrode includes at least a positive electrode current collector and a positive electrode active material layer. The positive electrode active material layer is formed on a surface of the positive electrode current collector. The positive electrode current collector includes an aluminum foil and a porous film. The porous film covers a surface of the aluminum foil. The porous film contains at least aluminum oxide. The porous film has a thickness not smaller than 10 nm and not greater than 800 nm. The porous film has a dynamic hardness not lower than 5 and not higher than 200.

9 Claims, 6 Drawing Sheets

(51) Int. Cl.

| | | |
|---|---|---|
| *H01M 4/139* | (2010.01) | |
| *H01M 4/70* | (2006.01) | |
| *H01M 10/0525* | (2010.01) | |
| *H01M 10/0587* | (2010.01) | |
| *H01M 50/531* | (2021.01) | |
| *H01M 4/02* | (2006.01) | |

(52) U.S. Cl.

CPC ......... *H01M 4/70* (2013.01); *H01M 10/0525* (2013.01); *H01M 10/0587* (2013.01); *H01M 2004/028* (2013.01)

(58) Field of Classification Search

CPC .... H01M 4/1391; H01M 4/625; H01M 4/661; H01M 4/667

See application file for complete search history.

(56) References Cited

U.S. PATENT DOCUMENTS

| | | | |
|---|---|---|---|
| 2006/0165986 A1* | 7/2006 | Potapova | B01J 23/40 |
| | | | 423/439 |
| 2008/0318130 A1 | 12/2008 | Ogawa et al. | |
| 2017/0352866 A1* | 12/2017 | Kawai | H01G 9/045 |
| 2017/0358816 A1 | 12/2017 | Sugiura | |
| 2018/0269472 A1 | 9/2018 | Ise et al. | |
| 2018/0323439 A1 | 11/2018 | Kimura et al. | |
| 2019/0067748 A1 | 2/2019 | Saeki et al. | |
| 2019/0280303 A1 | 9/2019 | Torita et al. | |
| 2019/0296305 A1 | 9/2019 | Ito et al. | |
| 2020/0020951 A1 | 1/2020 | Furusawa et al. | |

* cited by examiner

DEPTH OF INDENTATION

POSITIVE ELECTRODE, LITHIUM-ION SECONDARY BATTERY, AND METHOD OF PRODUCING POSITIVE ELECTRODE

This application is a continuation of U.S. application Ser. No. 16/296,531 filed Mar. 8, 2019, which claims priority from Japanese Patent Application No. 2018-044215 filed on Mar. 12, 2018 with the Japan Patent Office, the contents of which are hereby incorporated by reference in their respective entireties.

BACKGROUND

Field

The present disclosure relates to a positive electrode, a lithium-ion secondary battery, and a method of producing a positive electrode.

Description of the Background Art

Japanese Patent Laying-Open No. 2003-157852 discloses forming a film on a surface of an aluminum (Al) foil by heating the Al foil in water.

SUMMARY

When a short circuit is caused in a battery by, for example, an impact exerted from outside the battery (hereinafter, also called "external input") and if the positive electrode current collector (an Al foil, with a low resistance) comes into direct contact with the negative electrode (counter electrode), the short-circuit current is considered to be increased. The increase in the short-circuit current is considered to lead to an increase in heat generation. The "short circuit caused by an external input" is simulated by a nail penetration test, for example. Hereinafter, the "short circuit caused by an external input" may be simply referred to as "short circuit".

If a high-resistance film is formed on a surface of the Al foil, heat generation occurring upon a short circuit is expected to be decreased. The reason is considered to be that the high-resistance film inhibits the Al foil from coming into direct contact with the negative electrode.

In Japanese Patent Laying-Open No. 2003-157852, the film formation on a surface of the Al foil is carried out by heating the foil in water. This heat treatment is also called "boehmite treatment". Usually, a film formed by boehmite treatment tends to be hard. The hard film is considered to be broken or crushed when an electrode (positive electrode) is compressed during battery production. This breakage of the film is considered to lead to an increase in heat generation that occurs upon a short circuit.

An object of the present disclosure is to reduce heat generation that occurs in a battery upon a short circuit caused by, for example, an impact exerted from outside the battery.

In the following, the technical structure and the effects according to the present disclosure are described. It should be noted that part of the action mechanism according to the present disclosure is based on presumption. Therefore, the scope of claims should not be limited by whether or not the action mechanism is correct.

[1] A positive electrode according to the present disclosure is a positive electrode for a lithium-ion secondary battery.

The positive electrode includes at least a positive electrode current collector and a positive electrode active material layer. The positive electrode active material layer is formed on a surface of the positive electrode current collector. The positive electrode current collector includes an aluminum foil and a porous film. The porous film covers a surface of the aluminum foil. The porous film contains at least aluminum oxide. The porous film has a thickness not smaller than 10 nm and not greater than 800 nm. The porous film has a dynamic hardness not lower than 5 and not higher than 200.

The porous film according to the present disclosure contains aluminum oxide. In other words, the porous film is a ceramic film. The ceramic film can have a high resistance. It is considered that the porous film can inhibit the Al foil from coming into direct contact with a negative electrode upon a short circuit.

The dynamic hardness is a measure of the hardness of the porous film. The lower the dynamic hardness is, the softer the porous film is considered to be. The dynamic hardness of a film formed by the ordinary boehmite treatment is considered to be higher than 200. By the way, the dynamic hardness of the porous film according to the present disclosure is not higher than 200. Therefore, it is considered that the porous film according to the present disclosure is softer than a film formed by the ordinary boehmite treatment and therefore, upon electrode compression, continues covering a surface of the Al foil without being broken or crushed. Consequently, the positive electrode according to the present disclosure is considered to reduce heat generation that occurs upon a short circuit.

The dynamic hardness is not lower than 5. Forming a porous film having a dynamic hardness lower than 5 is considered to be difficult. The porous film has a thickness not smaller than 10 nm and not greater than 800 nm. In the configuration in which the thickness is smaller than 10 nm, only a small heat-generation-reducing effect can be obtained. In the configuration in which the thickness is greater than 800 nm, battery resistance can increase to a non-negligibly high level.

[2] The dynamic hardness of the porous film may be not higher than the dynamic hardness of the aluminum foil.

When an external input is applied and a foreign body penetrates the positive electrode, the positive electrode is considered to receive an impact. This impact is considered to cause deformation of the positive electrode. Upon deformation of the positive electrode, the porous film (which is softer than the Al foil) is considered to be likely to follow the contour of the Al foil. As a result, exposure of the Al foil is expected to be inhibited.

[3] The positive electrode according to the present disclosure may further include a conductive material. The conductive material may be disposed within the positive electrode active material layer and within pores formed in the porous film.

Normal use of the battery requires electronic conduction be established between the Al foil and the positive electrode active material layer. Because the conductive material is thus disposed within the positive electrode active material layer and within pores formed in the porous film, a desired electronic conduction is expected to be established between the Al foil and the positive electrode active material layer for normal use of the battery.

[4] The porous film may have a thickness not greater than 500 nm.

In the configuration in which the porous film has such a thickness, battery resistance is expected to be decreased.

[5] A lithium-ion secondary battery according to the present disclosure includes at least the positive electrode according to any one of [1] to [4] above and a negative electrode.

In the lithium-ion secondary battery according to the present disclosure, the level of heat generation that occurs upon a short circuit is expected to be small. The reason is considered to be that the porous film inhibits the Al foil from coming into direct contact with the negative electrode upon a short circuit.

[6] A method of producing a positive electrode according to the present disclosure is a method of producing a positive electrode for a lithium-ion secondary battery. The method of producing a positive electrode according to the present disclosure includes at least the following (a) to (d):

(a) preparing an aluminum foil;

(b) forming a porous film on a surface of the aluminum foil by bringing the aluminum foil into contact with superheated steam so as to form a positive electrode current collector;

(c) forming a positive electrode active material layer on a surface of the positive electrode current collector; and (d) compressing the positive electrode current collector and the positive electrode active material layer together, wherein the porous film contains at least aluminum oxide, the porous film after compression has a thickness not smaller than 10 nm and not greater than 800 nm, and the porous film after compression has a dynamic hardness not lower than 5 and not higher than 200.

By the method of producing a positive electrode according to the present disclosure, the positive electrode according to [1] above may be produced. The method of producing a positive electrode according to the present disclosure uses superheated steam. The "superheated steam" herein refers to water vapor heated to a temperature higher than 100° C. It is considered that in superheated steam, compared to either in water vapor at 100° C. or in hot water, hydrothermal reaction proceeds rapidly and the resulting porous film is likely to have pores with great pore sizes formed in the porous film. Having pores with great pore sizes, the porous film is considered to be soil. More specifically, it is considered that the porous film can have a dynamic hardness not higher than 200.

[7] In the method of producing a positive electrode according to the present disclosure, the positive electrode active material layer may be formed so as to contain a conductive material. A part of the conductive material may be disposed within pores formed in the porous film by compressing the positive electrode current collector and the positive electrode active material layer.

By this production method, the positive electrode according to [3] above may be produced.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

In the following, embodiments according to the present disclosure (herein called "present embodiment") are described. The scope of claims is not limited to the description below.

<Positive Electrode>

Figure 1:
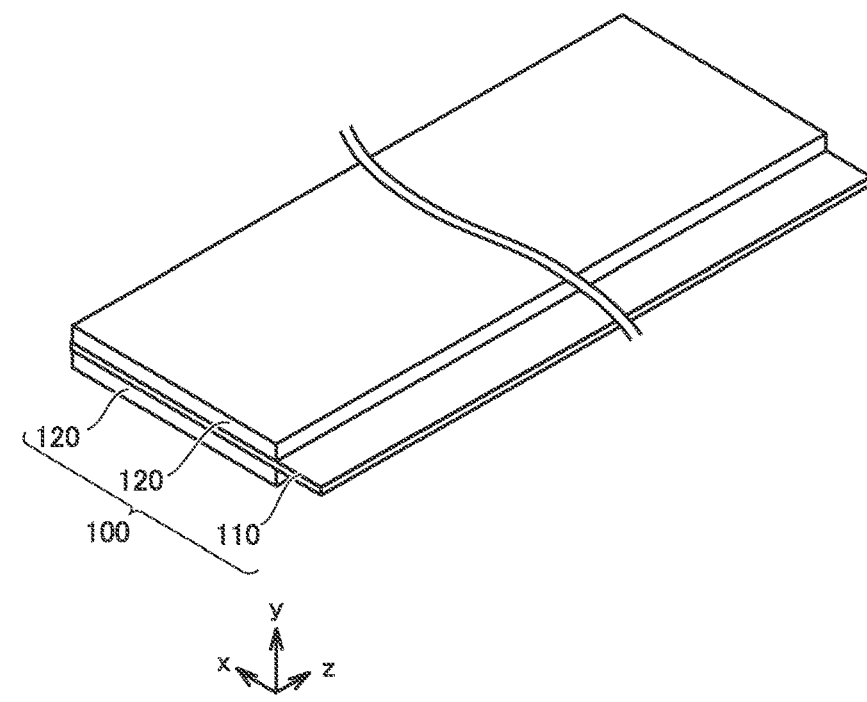
FIG. 1 is a schematic view illustrating the structure of the positive electrode according to the present embodiment.

FIG. 1 is a schematic view illustrating the structure of the positive electrode according to the present embodiment.

A positive electrode 100 is a positive electrode for a lithium-ion secondary battery. The lithium-ion secondary battery is described below in detail. Positive electrode 100 is in sheet form. Positive electrode 100 includes at least a positive electrode current collector 110 and a positive electrode active material layer 120. Positive electrode active material layer 120 is formed on a surface of positive electrode current collector 110. Positive electrode active material layer 120 may be formed on both sides of positive electrode current collector 110. The part of positive electrode current collector 110 protruding from positive electrode active material layer 120 in the x-axis direction in FIG. 1 may be used for connection to a positive electrode terminal 901 (described below).

<Positive Electrode Current Collector>

Figure 2:
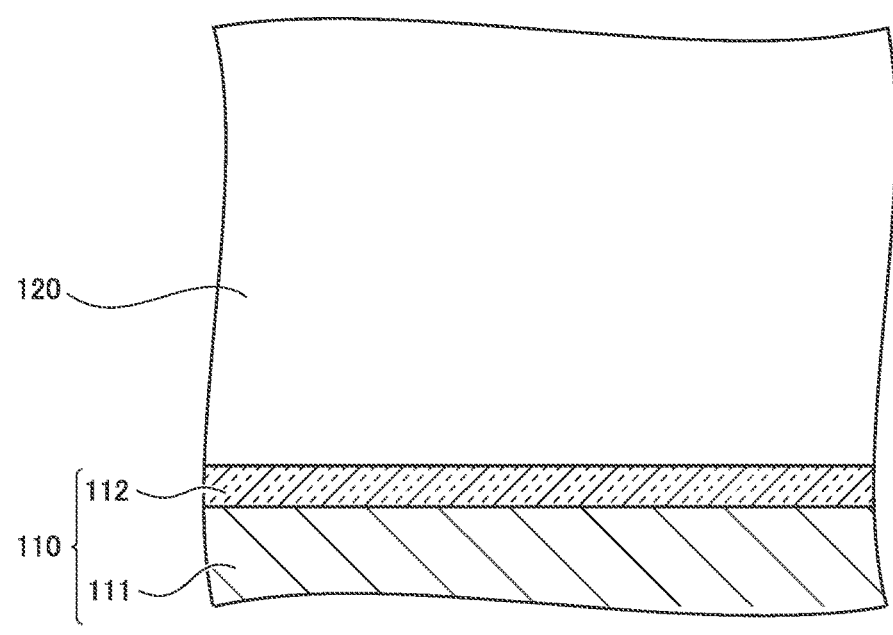
FIG. 2 is a conceptual sectional view illustrating the structure of the positive electrode according to the present embodiment.
Figure 2:
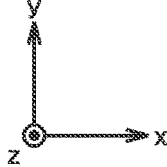

FIG. 2 is a conceptual sectional view illustrating the structure of the positive electrode according to the present embodiment.

Positive electrode current collector 110 includes an aluminum (Al) foil 111 and a porous film 112. Porous film 112 covers a surface of Al foil 111. Desirably, porous film 112 covers substantially the entire surface of Al foil 111. As long as heat generation occurring upon a short circuit can be reduced, however, part of the surface of Al foil 111 may be not covered with porous film 112.

<<Aluminum Foil>>

Al foil 111 according to the present embodiment may be a pure Al foil. Al foil 111 according to the present embodiment may be an Al alloy foil. Al foil 111 may contain Al in an amount not lower than 99 mass %, for example. Al foil 111 may contain an additive element. The additive element may be silicon (Si), iron (Fe), copper (Cu), manganese (Mn), magnesium (Mg), zinc (Zn), and/or titanium (Ti), for example. Al foil 111 may contain a trace amount of an impurity element that is inevitably entrapped during production or other processes.

As Al foil 111, a sheet of an alloy or alloys specified by Alloy Nos. 1085, 1070, 1050, 1N30, 1100, 3003, 3004, 8021, and/or 8079 in "JIS H 4160: Aluminium and aluminium alloy foils" may be used, for example. Al foil 111 may have a thickness not smaller than 5 μm and not greater than 50 μm, for example. Al foil 111 may have a thickness not smaller than 10 μm and not greater than 20 μm, for example.

<<Porous Film>>

Porous film 112 covers a surface of Al foil 111. Porous film 112 is considered to inhibit Al foil 111 from coming into direct contact with a negative electrode 200 (described below) upon a short circuit. This inhibition is considered to reduce an increase in short-circuit current and thereby reduce heat generation.

(Thickness of Porous Film)

The thickness of porous film 112 is not smaller than 10 nm and not greater than 800 nm. In the configuration in which the thickness is smaller than 10 nm, only a small heat-generation-reducing effect can be obtained. In the configuration in which the thickness is greater than 800 nm, battery resistance can increase to a non-negligibly high level. In the configuration in which porous film 112 is thick, an electronic conduction path may be less likely to be established between Al foil 111 and positive electrode active material layer 120.

The thickness of porous film 112 may be not greater than 500 nm. In the configuration in which porous film 112 has such a thickness, battery resistance is expected to be decreased. The thickness of porous film 112 may be not greater than 250 nm, for example. The thickness of porous film 112 may be not smaller than 50 nm, for example.

The "thickness of porous film 112" is measured in a cross-sectional micrograph of porous film 112. A microscope suitable for the subject of observation is used. The microscope may be a scanning electron microscope (SEM). The microscope may be a transmission electron microscope (TEM). The cross section is substantially parallel to the thickness direction of porous film 112 (namely, the y-axis direction in FIG. 2). The expression "(the cross section is) substantially parallel to the thickness direction" means that the angle formed between the cross section and the thickness direction is not smaller than 0 degree and not greater than 10 degrees. The cross-sectional sample may be prepared by using a cross section polisher apparatus (CP) or a focused ion beam apparatus (FIB), for example. The magnification may be changed, as appropriate, depending on the thickness of porous film 112. The magnification may be not lower than 10,000 times and not higher than 200,000 times, for example. The thickness is measured at 20 positions. The arithmetic mean of these 20 thickness measurements is used. Desirably, the distance between these 20 positions is not smaller than 100 nm, for example.

(Dynamic Hardness of Porous Film)

Porous film 112 is a soft film. The dynamic hardness of porous film 112 is not lower than 5 and not higher than 200. With the dynamic hardness being not higher than 200, porous film 112 is considered to continue covering a surface of Al foil 111 without being broken or crushed upon compression of positive electrode 100. Forming porous film 112 having a dynamic hardness lower than 5 is considered to be difficult. The dynamic hardness of porous film 112 may be not higher than 20, for example. The dynamic hardness of porous film 112 may be not lower than 10, for example.

The dynamic hardness of porous film 112 may be not higher than the dynamic hardness of Al foil 111. Porous film 112 that is softer than Al foil 111 is considered to be likely to follow the contour of Al foil 111 upon deformation of positive electrode 100. As a result, exposure of Al foil 111 is expected to be inhibited.

The "dynamic hardness" is measured with a microhardness tester. For example, a microhardness tester such as a Dynamic Ultra Micro Hardness Tester (model DUH-211S) manufactured by Shimadzu Corporation may be used. A tester that is equivalent to this model may also be used.

A predetermined indenter is prepared. The indenter is a triangular pyramidal indenter (ridge angle, 115 degrees). The indenter is made of diamond, for example. On the sample stage of the microhardness tester, a sample is placed. The sample is a combination of Al foil 111 and porous film 112, which means that positive electrode active material layer 120 is removed from a surface of porous film 112 before measurement. For easy removal of positive electrode active material layer 120, it is desirable that positive electrode active material layer 120 have been moistened with a solvent. The solvent may be N-methyl-2-pyrrolidone (NMP) and/or ethanol, for example. The removal of positive electrode active material layer 120 may be carried out with a spatula, for example. At the time of removal, force should be applied to porous film 112 carefully so as not to break porous film 112.

The indenter is pressed into the sample. Once the indenter has come into contact with the sample, a test force (unit, mN) is applied to the sample at a constant loading speed (unit, mN/sec). The test force is increased to reach a preset maximum test force, which is then maintained for ten seconds. After a lapse of ten seconds, the test force is released at a constant unloading speed (unit, mN/sec). The unloading speed is the same as the loading speed.

Figure 3:
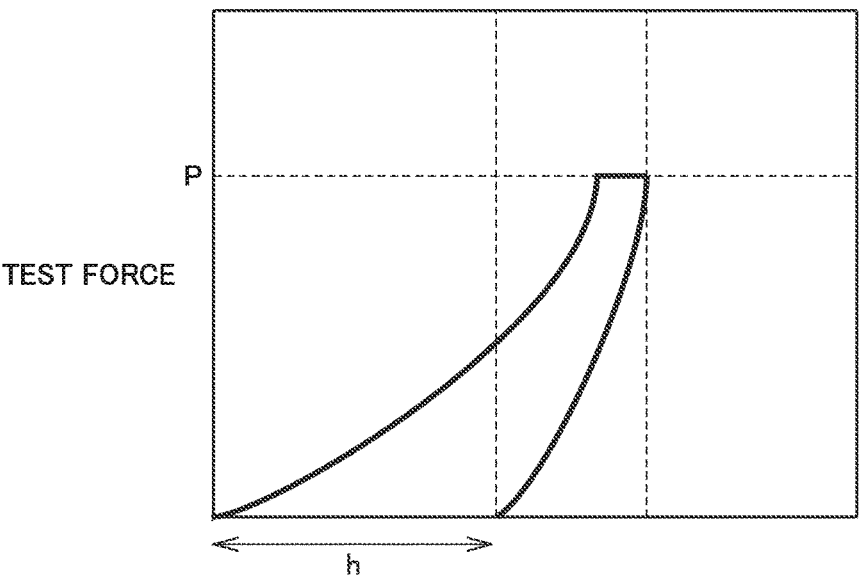
FIG. 3 is a graph describing the method of dynamic hardness measurement.

FIG. 3 is a graph describing the method of dynamic hardness measurement.

FIG. 3 shows the test force applied to the indenter for pressing it into the sample, in relation to the depth of indentation (pressed depth). From the graph, the depth (h) of indentation caused by plastic deformation is read. To calculate the dynamic hardness, the following formula is used:

$$\text{Dynamic hardness} = a \times P / h^2$$

(where a is a coefficient that depends on the shape of the indenter, a in the present embodiment is 37,838, P represents the maximum test force, and h represents the depth of indentation caused by plastic deformation).

The dynamic hardness is measured at least three times. The arithmetic mean of these at least three measurements is used. The same manner as in this measurement of the dynamic hardness of porous film 112 may be used to measure the dynamic hardness of Al foil 111.

(Average Pore Size of Porous Film)

Porous film 112 has a spongy structure. More specifically, porous film 112 has a plurality of pores formed in the interior thereof. The greater the average pore size is, the lower the dynamic hardness tends to be. In addition, the greater the average pore size is, the more likely a conductive material (described below) is to enter the pores formed in porous film 112 at the time of formation of positive electrode active material layer 120. The conductive material may be disposed within the pores formed in porous film 112. With the conductive material thus disposed within the pores formed in porous film 112, a desired electronic conduction path may be established. The disposition of the conductive material within the pores formed in porous film 112 may be checked in a cross-sectional micrograph, for example. The average pore size of porous film 112 may be not smaller than 80 nm, for example. In the configuration in which porous film 112 has such an average pore size, the conductive material is expected to be likely to enter the pores.

Desirably, a positive electrode active material is not present within the pores. In the configuration in which the positive electrode active material is not present within the pores, an increased level of heat-generation-reducing effect is expected to be obtained. The average pore size of porous film 112 may be not greater than 2000 nm, for example. In the configuration in which porous film 112 has such an average pore size, entrance of the positive electrode active material into the pores is expected to be inhibited. The average pore size of porous film 112 may be not greater than 1800 nm, for example. The average pore size of porous film 112 may be not greater than 1500 nm, for example. The average pore size of porous film 112 may be not greater than 1400 nm, for example. The average pore size of porous film 112 may be not greater than 1000 nm, for example.

The "average pore size" is measured in a micrograph of a surface of porous film 112. The micrograph of the surface is obtained by observing porous film 112 in the y-axis direction in FIG. 2. A microscope suitable for the subject of observation is used. The microscope may be an SEM. The microscope may be a TEM. In the micrograph of the surface, 20 pores are randomly selected. The maximum size of each pore is measured. The arithmetic mean of these 20 maximum sizes is defined as the average pore size.

(Composition of Porous Film)

Porous film 112 may originate from Al foil 111. Porous film 112 contains at least aluminum oxide ($Al_2O_3$). Because of this configuration, porous film 112 may have a high resistance. Porous film 112 may further contain water of crystallization ($H_2O$). More specifically, porous film 112 may contain at least one selected from the group consisting of boehmite ($Al_2O_3 \cdot H_2O$) and alumina ($Al_2O_3$). Porous film 112 may consist essentially of boehmite. Porous film 112 may consist essentially of alumina. Porous film 112 containing boehmite tends to have a small dynamic hardness.

<Positive Electrode Active Material Layer>

Positive electrode active material layer 120 is formed on a surface of positive electrode current collector 110. More specifically, positive electrode active material layer 120 is formed on a surface of porous film 112. Positive electrode active material layer 120 may have a thickness not smaller than 10 μm and not greater than 200 μm, for example. Positive electrode active material layer 120 may have a thickness not smaller than 100 μm and not greater than 200 μm, for example. Positive electrode active material layer 120 may have a density not lower than 3.0 $g/cm^3$ and not higher than 4.0 $g/cm^3$, for example. Positive electrode active material layer 120 may have a density not lower than 3.5 $g/cm^3$ and not higher than 3.9 $g/cm^3$, for example.

<<Positive Electrode Active Material>>

Positive electrode active material layer 120 contains at least a positive electrode active material. The positive electrode active material occludes and releases lithium ions. Typically, the positive electrode active material is a group of particles. The positive electrode active material may have a d50 not lower than 1 μm and not higher than 30 μm, for example. The "d50" refers to the particle size in volume-based particle size distribution at which the cumulative particle volume (accumulated from the side of small sizes) reaches 50% of the total particle volume. The volume-based particle size distribution may be measured with a laser-diffraction particle size distribution analyzer, for example.

The positive electrode active material is not particularly limited. The positive electrode active material may have any of various crystal structures. The crystal structure of the positive electrode active material may be identified in an X-ray diffraction (XRD) pattern, for example. The positive electrode active material may have a crystal structure of a lamellar rock salt type, a spinel type, or an olivine type, for example. The positive electrode active material may be lithium cobalt oxide ($LiCoO_2$), lithium nickel oxide ($LiNiO_2$), lithium manganese oxide (such as $LiMnO_2$ and $LiMn_2O_4$), lithium nickel cobalt manganese oxide (such as $LiNi_{1-3}Co_{1-3}Mn_{1-3}O_2$ and $LiNi_{0.5}Co_{0.2}Mn_{0.3}O_2$), lithium nickel cobalt aluminate (such as $LiNi_{0.82}Co_{0.15}Al_{0.03}O_2$), and/or lithium iron phosphate ($LiFePO_4$), for example. Positive electrode active material layer 120 may contain only one type of the positive electrode active material. Positive electrode active material layer 120 may contain two or more types of the positive electrode active material.

<<Conductive Material>>

Positive electrode active material layer 120 may further contain a conductive material. In other words, positive electrode 100 may further include a conductive material. The conductive material is electronically conductive. The conductive material can establish an electronic conduction path within positive electrode active material layer 120. The conductive material may be disposed within positive electrode active material layer 120 and within the pores formed in porous film 112. In this configuration, an electronic conduction path may also be established between Al foil 111 and positive electrode active material layer 120.

The conductive material may be carbon black (such as acetylene black, furnace black, and/or thermal black) and/or carbon short fibers, for example. Positive electrode 100 may include only one type of the conductive material. Positive electrode 100 may include two or more types of the conductive material. The content of the conductive material may be, for example, not lower than 0.1 part by mass and not higher than 100 parts by mass relative to 100 parts by mass of the positive electrode active material.

<<Binder>>

Positive electrode active material layer 120 may further contain a binder. The binder binds positive electrode current collector 110 and positive electrode active material layer 120 to each other. The binder binds the constituents of positive electrode active material layer 120 to each other. The binder is not particularly limited. The binder may be polyvinylidene difluoride (PVdF), polytetrafluoroethylene (PTFE), carboxymethylcellulose (CMC), and/or polyacrylic acid (PAA), for example. Positive electrode active material layer 120 may contain only one type of the binder. Positive electrode active material layer 120 may contain two or more types of the binder. The content of the binder may be, for example, not lower than 0.1 part by mass and not higher than 10 parts by mass relative to 100 parts by mass of the positive electrode active material.

<Method of Producing Positive Electrode>

Next, the method of producing a positive electrode according to the present embodiment is described.

Figure 4:
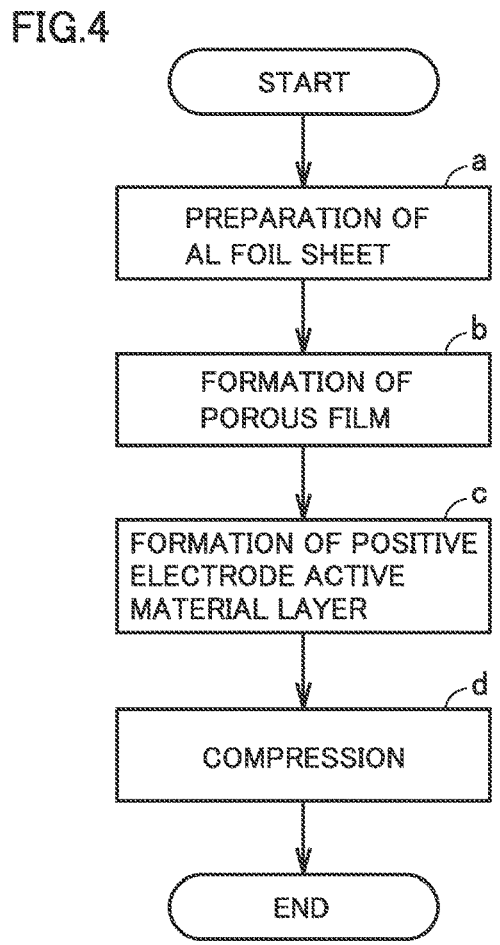
FIG. 4 is a flow chart schematically illustrating the method of producing a positive electrode according to the present embodiment.

FIG. 4 is a flow chart schematically illustrating the method of producing a positive electrode according to the present embodiment.

The method of producing a positive electrode according to the present embodiment includes at least "(a) preparation of Al foil", "(b) formation of a porous film", "(c) formation of a positive electrode active material layer", and "(d) compression".

<<(a) Preparation of Al Foil>>

The method of producing a positive electrode according to the present embodiment includes preparing Al foil 111. Al foil 111 is described above in detail. Al foil 111 may be prepared by purchasing a commercial equivalent for Al foil 111, or by producing Al foil 111.

<<(b) Formation of Porous Film>>

The method of producing a positive electrode according to the present embodiment includes forming porous film 112 on a surface of Al foil 111 by bringing Al foil 111 into contact with superheated steam so as to form positive electrode current collector 110.

Bringing Al foil 111 into contact with superheated steam may be carried out by, for example, passing Al foil 111 through a superheated steam dryer. By this procedure, a surface part of Al foil 1111 is converted to porous film 112. Porous film 112 contains at least aluminum oxide. The temperature of superheated steam is greater than 100° C. Porous film 112 formed by hydrothermal reaction in superheated steam is considered to be soft.

The temperature of superheated steam may be not lower than 150° C. and not higher than 500° C., for example. The higher the temperature of superheated steam is, the lower the dynamic hardness of porous film 112 tends to be. In other words, the higher the temperature of superheated steam is, the softer porous film 112 tends to be. It should be noted that once the temperature of superheated steam exceeds 500° C., boehmite starts to degrade and thereby alumina tends to be produced. Alumina is considered to be harder than boehmite. It is considered that alumina production tends to lead to an increase in the dynamic hardness. The temperature of superheated steam may be not lower than 150° C. and not higher than 490° C., for example. In the configuration in which temperature of superheated steam is within this range, boehmite tends to be produced.

The duration for which Al foil 111 is in contact with superheated steam may be not shorter than 20 seconds and not longer than 600 seconds, for example. The longer the contact duration is, the thicker porous film 112 tends to be. The contact duration may be not longer than 240 seconds, for example. The contact duration may be not longer than 60 seconds, for example. The contact duration may be not shorter than 40 seconds, for example.

The flow rate of superheated steam within the superheated steam dryer may be changed, as appropriate, depending on the length of the dryer, the line speed, and/or the width dimension of Al foil 111, for example. The flow rate of superheated steam may be not lower than 10 kg/h and not higher than 30 kg/h, for example.

<<(c) Formation of Positive Electrode Active Material Layer>>

The method of producing a positive electrode according to the present embodiment includes forming positive electrode active material layer 120 on a surface of positive electrode current collector 110.

For example, the positive electrode active material, the conductive material, the binder, and a solvent may be mixed to prepare a slurry. The resulting slurry may be applied to a surface of positive electrode current collector 110, followed by drying, to form positive electrode active material layer 120. The positive electrode active material, for example, is described above in detail. Positive electrode active material layer 120 may be formed so as to contain the conductive material. Positive electrode active material layer 120 may be formed in a predetermined region on a surface of positive electrode current collector 110 so as to meet the specification of a battery 1000 (described below).

<<(d) Compression>>

The method of producing a positive electrode according to the present embodiment includes compressing positive electrode current collector 110 and positive electrode active material layer 120 together.

A combination of positive electrode current collector 110 and positive electrode active material layer 120 may be compressed with rollers, for example. The compression is carried out in such a manner that the compressed porous film 112 has a thickness not smaller than 10 nm and not greater than 800 nm and a dynamic hardness not lower than 5 and not higher than 200. The thickness and the dynamic hardness of the compressed porous film 112 can be adjusted by selecting various combinations of the conditions of formation of porous film 112 and the conditions of compression of porous film 112. The linear pressure of the rollers may be adjusted to fall within the range from 10 t/cm to 11 t/cm, for example.

The compression may be carried out in such a manner that part of the conductive material contained in positive electrode active material layer 120 is disposed within the pores formed in porous film 112. Distribution of the conductive material can be adjusted by selecting various combinations of the conditions of formation of porous film 112 and the conditions of compression of porous film 112.

In this way, positive electrode 100 according to the present embodiment may be produced. Positive electrode 100 may be cut into predetermined outer dimensions so as to meet the specification of battery 1000.

<Lithium-Ion Secondary Battery>

Next, the lithium-ion secondary battery according to the present embodiment is described. Hereinafter, a lithium-ion secondary battery may be simply referred to as "battery".

Figure 5:
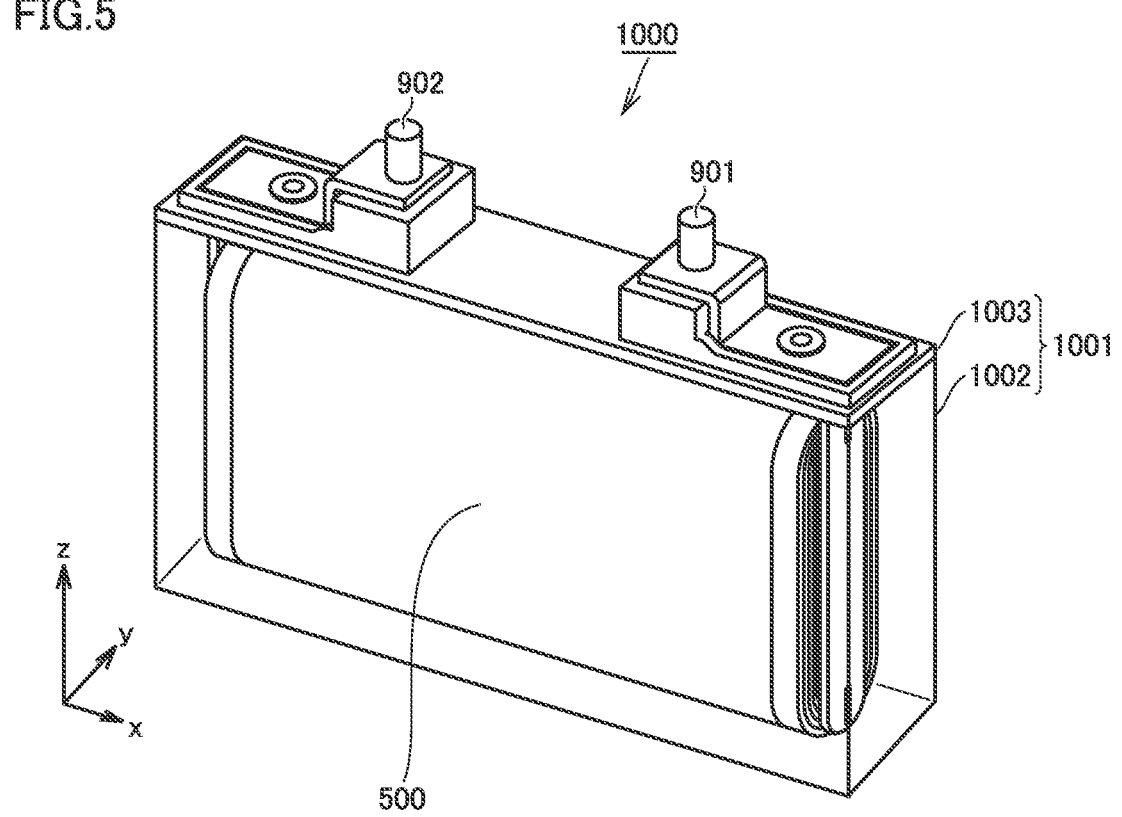
FIG. 5 is a schematic view illustrating the structure of the lithium-ion secondary battery according to the present embodiment.

FIG. 5 is a schematic view illustrating the structure of the lithium-ion secondary battery according to the present embodiment.

Battery 1000 is a lithium-ion secondary battery. Battery 1000 includes a casing 1001. Casing 1001 is hermetically sealed. Casing 1001 is prismatic (a flat, rectangular parallelepiped). Alternatively, casing 1001 may be cylindrical, for example. Casing 1001 may be, for example, a pouch made of an aluminum-laminated film.

Casing 1001 includes a container 1002 and a cap 1003. Cap 1003 is bonded to container 1002 by, for example, laser beam welding. Cap 1003 is equipped with positive electrode terminal 901 and a negative electrode terminal 902. Cap 1003 may be further equipped with a liquid inlet, a gas-discharge valve, and a current interrupt device (CID), for example. Casing 1001 accommodates an electrode array 500 and an electrolyte (not shown).

Figure 6:
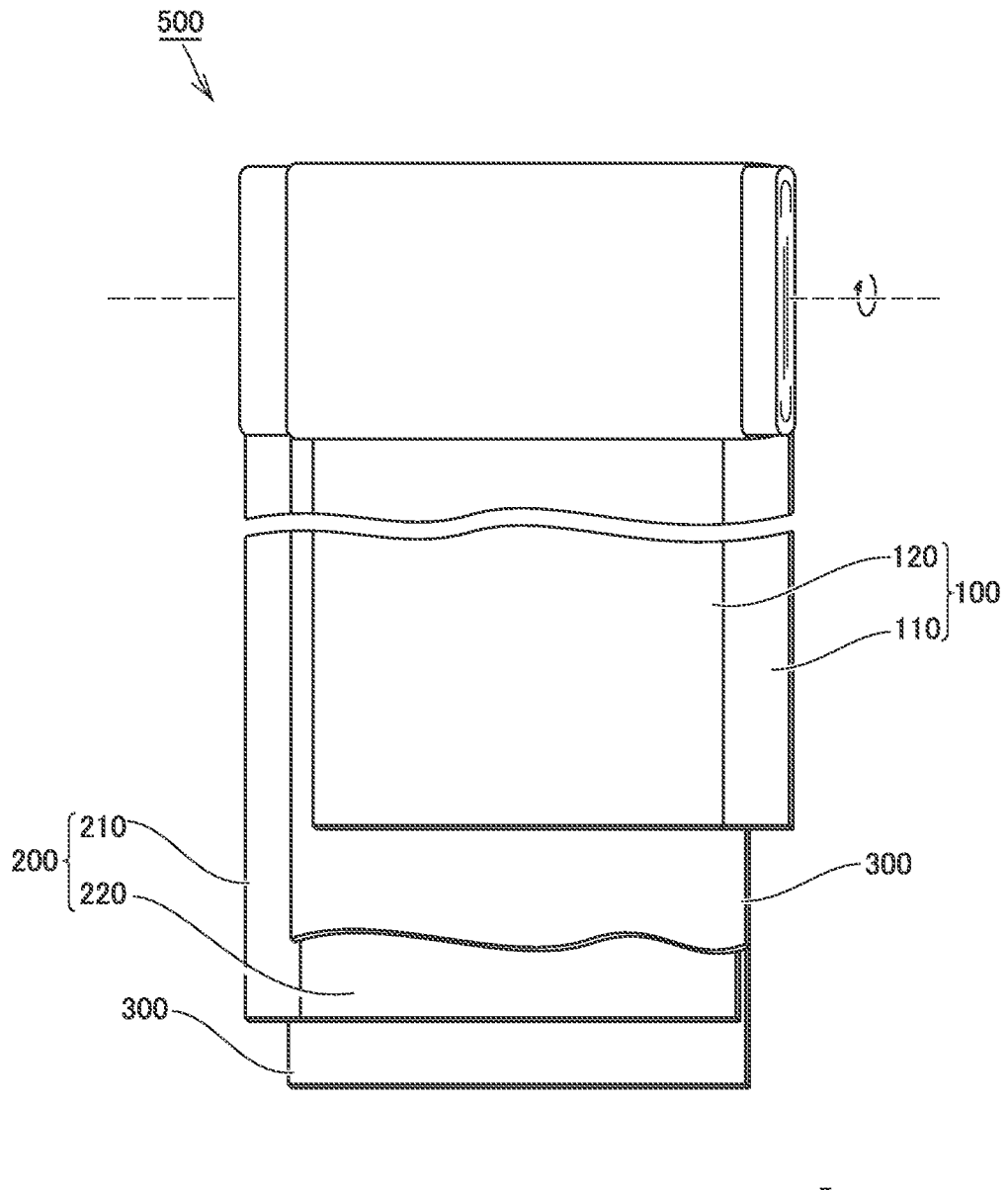
FIG. 6 is a schematic view illustrating the structure of an electrode array according to the present embodiment.

FIG. 6 is a schematic view illustrating the structure of the electrode array according to the present embodiment.

Electrode array 500 is a wound-type one. Electrode array 500 is formed by stacking positive electrode 100, one separator 300, a negative electrode 200, and another separator 300 in this order and then winding them in a spiral fashion. In other words, battery 1000 includes at least positive electrode 100 and negative electrode 200. Positive electrode 100 is described above in detail. Because battery 1000 includes positive electrode 100 according to the present embodiment, heat generation occurring upon a short circuit is expected to be decreased.

Electrode array 500 may be a stack-type one. More specifically, electrode array 500 may be formed by alternately stacking one positive electrode 100 and one negative electrode 200 and then repeating this alternate stacking process more than once. In each space between positive electrode 100 and negative electrode 200, separator 300 is interposed.

<Negative Electrode>

Figure 7:
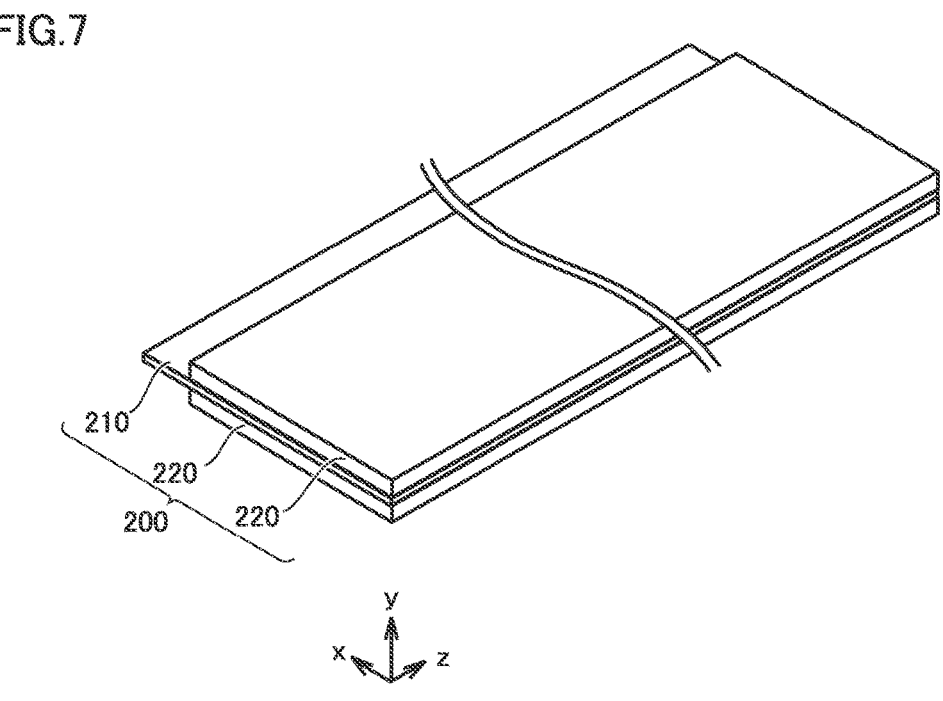
FIG. 7 is a schematic view illustrating the structure of the negative electrode according to the present embodiment.

FIG. 7 is a schematic view illustrating the structure of the negative electrode according to the present embodiment.

Battery 1000 includes at least negative electrode 200. Negative electrode 200 is in sheet form. Negative electrode 200 includes a negative electrode current collector 210 and a negative electrode active material layer 220. Negative electrode active material layer 220 is formed on a surface of negative electrode current collector 210. Negative electrode active material layer 220 may be formed on both sides of negative electrode current collector 210.

Negative electrode current collector 210 may be made of copper (Cu) foil, for example. Negative electrode current collector 210 may have a thickness not smaller than 5 μm and not greater than 50 μm, for example. The part of negative electrode current collector 210 protruding from negative electrode active material layer 220 in the x-axis direction in FIG. 7 may be used for connection to negative electrode terminal 902 (FIG. 5).

Negative electrode active material layer 220 may have a thickness not smaller than 10 μm and not greater than 200 μm, for example. Negative electrode active material layer 220 contains at least a negative electrode active material. Negative electrode active material layer 220 may further contain a binder.

The negative electrode active material occludes and releases lithium ions. The negative electrode active material may have a d50 not lower than 1 μm and not higher than 30 μm, for example. The negative electrode active material is not particularly limited. The negative electrode active material may be graphite, soft carbon, hard carbon, silicon, silicon oxide, silicon-based alloy, tin, tin oxide, and/or tin-based alloy, for example. Negative electrode active material layer 220 may contain only one type of the negative electrode active material. Negative electrode active material layer 220 may contain two or more types of the negative electrode active material.

The binder is not particularly limited. The binder may be CMC and styrene-butadiene rubber (SBR), for example. The content of the binder may be, for example, not lower than 0.1 part by mass and not higher than 10 parts by mass relative to 100 parts by mass of the negative electrode active material.

<Separator>

Battery 1000 may include separator 300. Separator 300 is interposed between positive electrode 100 and negative electrode 200. Positive electrode 100 and negative electrode 200 are separated from each other by separator 300. Separator 300 is a porous film. Separator 300 is electrically insulating. Separator 300 may have a thickness not smaller than 5 μm and not greater than 50 μm, for example. Separator 300 may be made of polyolefin, for example.

Separator 300 may be made of polyethylene (PE), for example. Separator 300 may be made of polypropylene (PP), for example. Separator 300 may have a monolayer structure, for example. Separator 300 may consist of a porous PE film, for example. Separator 300 may have a multilayer structure, for example. Separator 300 may be formed by, for example, stacking a porous PP film, a porous PE film, and a porous PP film in this order. Separator 300 may include a heat-resistant layer on a surface thereof. The heat-resistant layer contains a heat-resistant material. The heat-resistant material may be alumina, boehmite, titania, silica, and/or polyimide, for example.

<Electrolyte>

Battery 1000 includes at least an electrolyte. The electrolyte is a lithium-ion conductor. The electrolyte may be a liquid electrolyte, for example. The electrolyte may be a gelled electrolyte, for example. The electrolyte may be a solid electrolyte, for example. The liquid electrolyte may be an electrolyte solution or an ionic liquid, for example. In the present specification, the electrolyte in the form of electrolyte solution is described as an example.

The electrolyte solution contains at least a supporting salt and a solvent. The electrolyte solution may contain the supporting salt in an amount not lower than 0.5 mol/L and not higher than 2 mol/L (not lower than 0.5 M and not higher than 2 M), for example. The supporting salt is dissolved in the solvent. The supporting salt may be $LiPF_6$, $LiBF_4$, $Li[N(FSO_2)_2]$, and/or $Li[N(CF_3SO_2)_2]$, for example. The electrolyte solution may contain only one type of the supporting salt. The electrolyte solution may contain two or more types of the supporting salt.

The solvent is aprotic. The solvent may be a mixture of a cyclic carbonate and a chain carbonate, for example. The mixing ratio may be "(cyclic carbonate):(chain carbonate) =1:9 to 5:5 (volume ratio)", for example.

The cyclic carbonate may be ethylene carbonate (EC), propylene carbonate (PC), butylene carbonate (BC), and/or fluoroethylene carbonate (FEC), for example. The solvent may contain only one type of the cyclic carbonate. The solvent may contain two or more types of the cyclic carbonate.

The chain carbonate may be dimethyl carbonate (DMC), ethyl methyl carbonate (EMC), and/or diethyl carbonate (DEC), for example. The solvent may contain only one type of the chain carbonate. The solvent may contain two or more types of the chain carbonate.

The solvent may contain a lactone, a cyclic ether, a chain ether, and/or a carboxylic acid ester, for example. The lactone may be γ-butyrolactone (GBL) and/or δ-valerolactone, for example. The cyclic ether may be tetrahydrofuran (THF), 1,3-dioxolane, and/or 1,4-dioxane, for example. The chain ether may be 1,2-dimethoxyethane (DME), for example. The carboxylic acid ester may be methyl formate (MF), methyl acetate (MA), and/or methyl propionate (MP), for example.

The electrolyte solution may further contain various additives in addition to the supporting salt and the solvent. The electrolyte solution may contain the additives in an amount not lower than 0.005 mol/L and not higher than 0.5 mol/L, for example. Examples of the additives include a gas generation agent (also called anti-overcharging additive), a solid electrolyte interface (SEI) film-forming agent, and a flame retardant. The gas generation agent may be cyclohexylbenzene (CHB) and/or biphenyl (BP), for example. The SEI-film-forming agent may be vinylene carbonate (VC), vinylethylene carbonate (VEC), $Li[B(C_2O_4)_2]$, $LiPO_2F_2$, propane sultone (PS), and/or ethylene sulfite (ES), for example. The flame retardant may be a phosphoric acid ester and/or a phosphazene, for example.

EXAMPLES

In the following, examples according to the present disclosure are described. The scope of claims is not limited to the description below.

<Production of Positive Electrode>

Example 1

1-1. (a) Preparation of Al Foil

Al foil 111 having a belt shape (Alloy No. 1085, with a thickness of 15 μm and a dynamic hardness of 200) was prepared. The width dimension of Al foil 111 (dimension in the x-axis direction in FIG. 1) was 130 mm.

1-2. (b) Formation of Porous Film

A superheated steam dryer was prepared. Al foil 111 was passed through the superheated steam dryer. Al foil 111 was brought into contact with superheated steam in this way and as a result, porous film 112 was formed on a surface of Al foil 111. Thus, positive electrode current collector 110 was formed. The temperature of superheated steam was 250° C. The contact duration was 60 seconds. The flow rate of superheated steam was 20 kg/h.

1-3. (c) Formation of Positive Electrode Active Material Layer

The materials described below were prepared.

Positive electrode active material: lithium nickel cobalt manganese oxide

Conductive material: acetylene black (powder)

Binder: PVdF

Solvent: NMP

The positive electrode active material, the conductive material, the binder, and the solvent were mixed, and thus a slurry was prepared. The resulting slurry was applied to the surface of positive electrode current collector 110 (both sides), followed by drying, and thus positive electrode active material layer 120 was formed. Positive electrode active material layer 120 had the following composition: "(positive electrode active material):(conductive material):binder=98: 1:1 (mass ratio)". Positive electrode active material layer 120 had a weight per unit area (mass per unit area) of 25 mg/cm². Positive electrode active material layer 120 had a width dimension (dimension in the x-axis direction in FIG. 1) of 110 mm.

1-4. (d) Compression

Rollers were prepared. The rollers were used to compress positive electrode current collector 110 and positive electrode active material layer 120 together. The linear pressure of the rollers was 11 t/cm. In this way, positive electrode 100 was produced. Positive electrode 100 was a belt-shaped sheet.

After compression, the thickness and the dynamic hardness of porous film 112 were measured by the methods described above. Results are shown in Table 1 below. A cross-sectional SEM micrograph shows that part of the conductive material was disposed within the pores formed in porous film 112.

Examples 2 to 10

Positive electrode 100 was produced in the same manner as in Example 1 except that the conditions of formation of porous film 112 were changed as specified in Table 1 below.

Comparative Example 1

Positive electrode 100 was produced in the same manner as in Example 1 except that Al foil 111 was used, as positive electrode current collector 110, as it was without porous film 112 formed on a surface thereof.

Comparative Example 2

Positive electrode 100 was produced in the same manner as in Example 1 except that porous film 112 was formed by immersing Al foil 111 in hot water having a temperature of 100° C. for 60 seconds.

Comparative Examples 3 and 4

Positive electrode 100 was produced in the same manner as in Example 1 except that the conditions of formation of porous film 112 were changed as specified in Table 1 below.

<Production of Lithium-Ion Secondary Battery>

2. Production of Negative Electrode

The materials described below were prepared.

Negative electrode active material: natural graphite

Binder: CMC and SBR

Solvent: ion-exchanged water

Negative electrode current collector: Cu foil having a belt shape (10 μm in thickness and 132 mm in width dimension)

The width dimension refers to the dimension in the x-axis direction in FIG. 7.

The negative electrode active material, the binder, and the solvent were mixed, and thus a slurry was prepared. The resulting slurry was applied to the surface of negative electrode current collector 210 (both sides), followed by drying, and thus negative electrode active material layer 220 was formed. The weight per unit area of negative electrode active material layer 220 was 20 mg/cm². The width dimension of negative electrode active material layer 220 (dimension in the x-axis direction in FIG. 7) was 112 mm. In this way, negative electrode 200 was produced. Negative electrode 200 was a belt-shaped sheet.

3. Preparation of Separator

A porous PE film (120 mm in width dimension and 20 μm in thickness) was prepared. As a heat-resistant material, alumina (powder) was prepared. The heat-resistant material, a binder, and a solvent were mixed, and thus a slurry was prepared. The resulting slurry was applied to a surface of separator 300, followed by drying, and thus a heat-resistant layer was formed. The resulting heat-resistant layer had a thickness of 4 μm. In this way, separator 300 was prepared.

4. Preparation of Electrolyte Solution

An electrolyte solution was prepared. The electrolyte solution had a composition described below.

Lithium salt: $LiPF_6$ (concentration, 1 mol/L)

Solvent: [EC:EMC:DEC=3:4:3 (volume ratio)]

5. Assembly

Positive electrode 100, separator 300, negative electrode 200, and separator 300 were stacked in this order and then wound in a spiral fashion. Thus, electrode array 500 was formed.

Casing 1001 was prepared. Casing 1001 was prismatic. Casing 1001 had the following outer dimensions: 75 mm in height dimension, 120 mm in width dimension, and 15 mm in depth dimension. The height dimension refers to the dimension in the z-axis direction in FIG. 5. The width dimension refers to the dimension in the x-axis direction in FIG. 5. The depth dimension refers to the dimension in the y-axis direction in FIG. 5. Casing 1001 had a wall thickness of 1 mm.

In casing 1001, electrode array 500 was placed. Into casing 1001, the electrolyte solution was injected. Casing 1001 was hermetically sealed. Thus, battery 1000 (lithium-ion secondary battery) was produced. Battery 1000 was designed to have a rated capacity of 5 Ah within a voltage range from 3.0 to 4.1 V.

6. Charge and Discharge for Completing Battery Production

Under an environment at 25° C., battery 1000 was charged to 4.2 V at a rate of 1 C. At a rate of "1 C", charging to the rated capacity completes in one hour. After five minutes of resting, battery 1000 was discharged to 3.0 V at a rate of 1 C.

Then, the initial capacity of battery 1000 was determined by carrying out charging in the constant current constant voltage (CC-CV) mode and discharging in the CC-CV mode.

Charging in CC-CV mode: CC=1 C, CV=4.1 V, cut-off current=0.01 C

Discharging in CC-CV mode: CC=1 C, CV=3.0 V, cut-off current=0.01 C

<Evaluation>

<<Nail Penetration Test>>

The state of charge (SOC) of battery 1000 was adjusted to 100%. A nail was prepared. The nail had a shank diameter of 3 mm and an R value of 1 mm at the tip. The nail was driven into battery 1000 at a rate of 1 mm/sec. The maximum temperature to which the temperature of battery 1000 reached was measured. The maximum temperature refers to the surface temperature of battery 1000 measured one second after the nail was driven into battery 1000. The maximum temperature is shown in Table 1 below. It is considered that the lower the maximum temperature determined in the nail penetration test was, the greater the reduction was in heat generation that occurred in the battery upon a short circuit caused by, for example, an impact exerted from outside the battery.

<<Battery Resistance>>

The SOC of battery 1000 was adjusted to 50%. Battery 1000 was discharged at a rate of 10 C for ten seconds. The level of voltage drop caused in that ten seconds elapsed after the start of the discharging was measured. Based on the relationship between the level of voltage drop and the rate, the battery resistance was calculated. The battery resistance is shown in Table 1 below. It is considered that a battery resistance higher than 4 mΩ is unacceptable in view of the specification of battery 1000 in the examples.

Results

In Comparative Example 1, the level of heat generation occurred upon a short circuit was great. The reason is considered to be that porous film 112 was not formed on a surface of Al foil 111.

In Comparative Example 2, the level of heat generation occurred upon a short circuit was great. The reason is considered to be the high dynamic hardness of porous film 112, which was higher than 200. More specifically, the reason is considered to be that the hard porous film 112 was broken or crushed when positive electrode 100 was compressed. Another potential reason is that porous film 112, with a dynamic hardness higher than that of Al foil 111, was less likely to follow the contour of Al foil 111 upon deformation of positive electrode 100 and thereby had cracks or the like formed in the film.

In Examples 1 to 10, the level of heat generation occurred upon a short circuit was small. The reason is considered to be that porous film 112 inhibited Al foil 111 from coming into direct contact with negative electrode 200. In Examples 1 to 6, the thickness of porous film 112 was not smaller than 10 nm and not greater than 800 nm. In Examples 1 to 6, the dynamic hardness of porous film 112 was not lower than 5 and not higher than 200.

The results obtained in Examples 1 to 5 show a tendency that the higher the temperature of superheated steam was, the lower the dynamic hardness was. However, the results obtained in Examples 5 and 6 show that the dynamic hardness increased as the temperature of superheated steam increased from 490° C. to 500° C. It is considered that in the configuration in which the temperature of superheated steam was not higher than 490° C., only a soft boehmite was produced. It is considered that in the configuration in which the temperature of superheated steam was 500° C. or higher, hard alumina was produced. The dynamic hardness in Example 5 was 5. The dynamic hardness in Example 6 was 9. Therefore, forming porous film 112 having a dynamic hardness lower than 5 was considered to be difficult.

TABLE 1

List of Examples and Comparative Examples

| | Conditions of formation of porous film (conditions of hydrothermal reaction of Al foil) | | | Conditions of compression | Porous film | | | | | | Evaluation | |
| | | | | Linear | | | | Composition | | | | Max. temp. in nail penetration |
| | — | Temp. [° C.] | Time [sec] | pressure [t/cm] | Thickness [nm] | Dynamic hardness [-] | Aeerage pore size [nm] | Boehmite $Al_2O_3 \cdot H_2O$ [mass %] | Alumina $Al_2O_3$ [mass %] | Battery resistance [mΩ] | test [° C.] |
|---|---|---|---|---|---|---|---|---|---|---|---|
| Ex. 1 | Superheated steam | 250 | 60 | 11 | 250 | 20 | 1000 | 100 | 0 | 3.5 | 300 |
| Ex. 2 | Superheated steam | 150 | 60 | 11 | 250 | 200 | 80 | 100 | 0 | 3.5 | 300 |
| Ex. 3 | Superheated steam | 350 | 60 | 11 | 250 | 10 | 1400 | 100 | 0 | 3.5 | 300 |
| Ex. 4 | Superheated steam | 450 | 60 | 11 | 250 | 7 | 1800 | 100 | 0 | 3.5 | 300 |
| Ex. 5 | Superheated steam | 490 | 60 | 11 | 250 | 5 | 2000 | 100 | 0 | 3.5 | 300 |
| Ex. 6 | Superheated steam | 500 | 60 | 11 | 250 | 9 | 1500 | 0 | 100 | 3.5 | 300 |
| Ex. 7 | Superheated steam | 250 | 20 | 11 | 10 | 20 | 1000 | 100 | 0 | 3.5 | 300 |
| Ex. 8 | Superheated steam | 250 | 40 | 11 | 50 | 20 | 1000 | 100 | 0 | 3.5 | 300 |
| Ex. 9 | Superheated steam | 250 | 240 | 11 | 500 | 20 | 1000 | 100 | 0 | 3.6 | 300 |
| Ex. 10 | Superheated steam | 250 | 600 | 11 | 800 | 70 | 1000 | 100 | 0 | 4 | 300 |
| Comp. Ex. 1 | — | — | — | 11 | 0 | 200[*1] | — | — | — | 3.4 | 750 |
| Comp. Ex. 2 | Hot water | 100 | 60 | 11 | 750 | 210 | 70 | 100 | 0 | 3.5 | 600 |
| Comp. Ex. 3 | Superheated steam | 250 | 10 | 11 | 5 | 20 | 1000 | 100 | 0 | 3.5 | 650 |
| Comp. Ex. 4 | Superheated steam | 250 | 3000 | 11 | 850 | 20 | 1000 | 100 | 0 | 7 | 300 |

[*1]The dynamic hardness in Comparative Example 1 refers to the dynamic hardness of Al foil (Alloy No. 1085).

In Comparative Example 3, the level of heat generation occurred upon a short circuit was great. The reason is considered to be the thickness of porous film 112, which was smaller than 10 nm.

In Comparative Example 4, battery resistance increased to a non-negligibly high level. The reason is considered to be the thickness of porous film 112, which was greater than 800 nm. More specifically, the reason is considered to be that the thick porous film 112 made it difficult for an electronic conduction path to be established between Al foil 111 and positive electrode active material layer 120.

Figure 8:
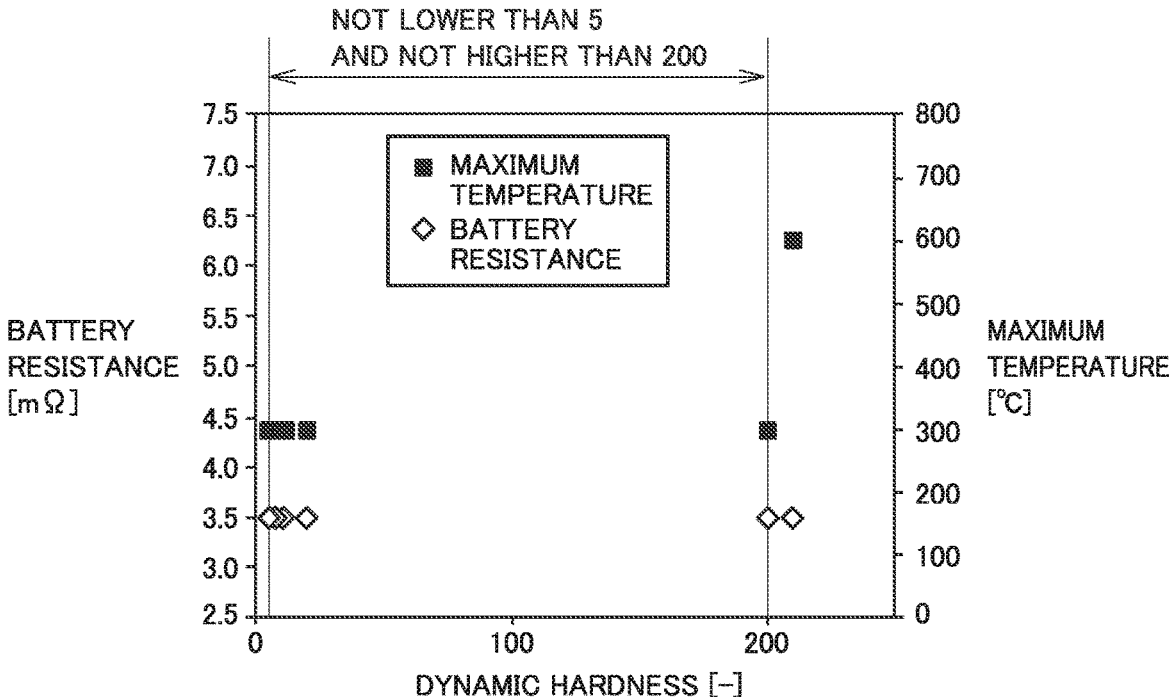
FIG. 8 is a graph showing both a maximum temperature determined in a nail penetration test and a battery resistance in relation to the dynamic hardness of a porous film.

FIG. 8 is a graph showing both the maximum temperature determined in the nail penetration test and the battery resistance in relation to the dynamic hardness of the porous film. In the configuration in which the dynamic hardness was higher than 200, the level of heat generation tended to be remarkably great.

Figure 9:
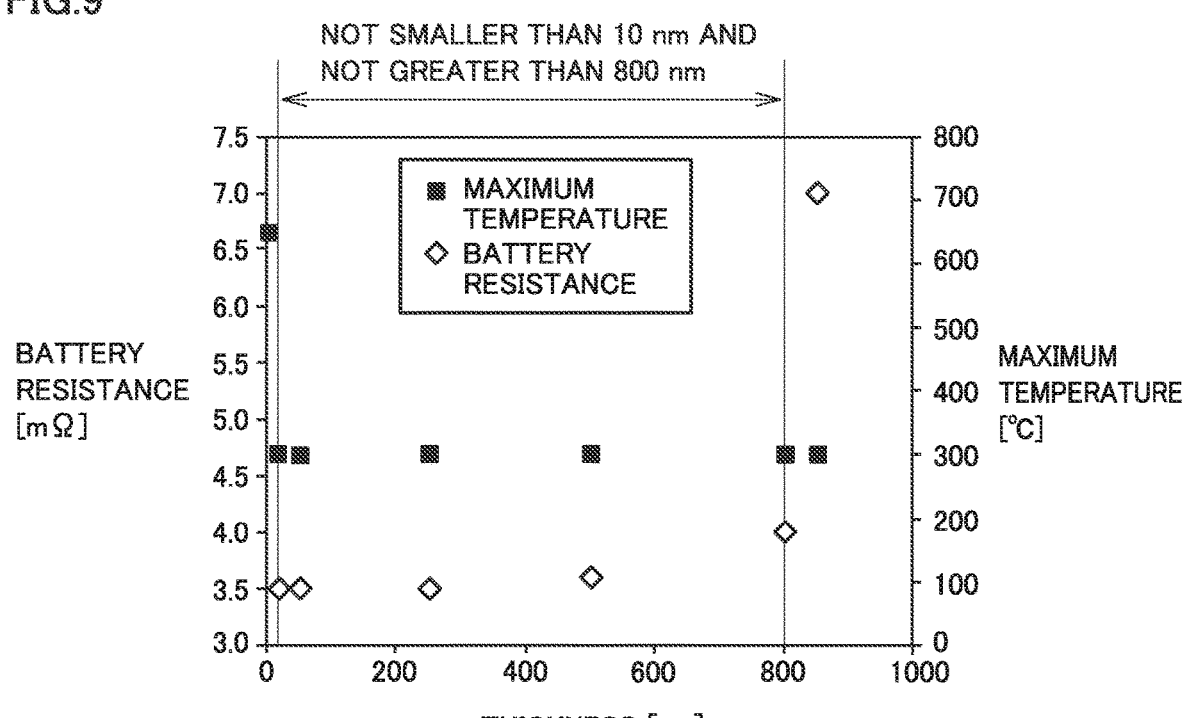
FIG. 9 is a graph showing both a maximum temperature determined in a nail penetration test and a battery resistance in relation to the thickness of a porous film.

FIG. 9 is a graph showing both the maximum temperature determined in the nail penetration test and the battery resistance in relation to the thickness of the porous film. In the configuration in which the thickness was smaller than 10 nm, the level of heat generation tended to be remarkably great. In the configuration in which the thickness was greater than 800 nm, battery resistance tended to be remarkably high. In the configuration in which the thickness of porous film 112 was not greater than 500 nm, battery resistance tended to be low.

The embodiments and examples disclosed herein are illustrative and non-restrictive in any respect. The technical scope indicated by the claims is intended to include any modifications within the scope and meaning equivalent to the terms of the claims.

What is claimed is:

1. A method of producing a positive electrode for a lithium-ion secondary battery, comprising at least:

preparing an aluminum foil;

forming a porous film on a surface of the aluminum foil by bringing the aluminum foil into contact with super-heated steam so as to form a positive electrode current collector;

forming a positive electrode active material layer on a surface of the positive electrode current collector; and compressing the positive electrode current collector and the positive electrode active material layer together, the porous film containing at least aluminum oxide, the porous film after compression having a thickness not smaller than 10 nm and not greater than 800 nm, the porous film after compression having a dynamic hardness not lower than 5 and not higher than 200, a duration for which the aluminum foil is in contact with the superheated steam is 20 seconds to 600 seconds.

2. The method of producing a positive electrode according to claim 1, wherein the positive electrode active material layer is formed so as to contain a conductive material, a part of the conductive material is disposed within pores formed in the porous film by compressing the positive electrode current collector and the positive electrode active material layer.

3. The method of producing a positive electrode according to claim 1, wherein a temperature of the superheated steam is not lower than 150° C. and not higher than 500° C.

4. The method of producing a positive electrode according to claim 1, wherein a duration for which the aluminum foil is in contact with the superheated steam is 20 seconds to 60 seconds.

5. The method of producing a positive electrode according to claim 1, wherein a duration for which the aluminum foil is in contact with the superheated steam is 40 seconds to 600 seconds.

6. The method of producing a positive electrode according to claim 1, wherein a duration for which the aluminum foil is in contact with the superheated steam is 40 seconds to 240 seconds.

7. The method of producing a positive electrode according to claim 1, wherein a flow rate of the superheated steam is 10 kg/h to 30 kg/h.

8. The method of producing a positive electrode according to claim 1, wherein the porous film has an average pore size of 80 nm to 2000 nm.

9. The method of producing a positive electrode according to claim 1, wherein the positive electrode active material layer is formed directly on a surface of the porous film.

\* \* \* \* \*